United States Patent [19]

Lawrence et al.

[11] 4,275,789
[45] Jun. 30, 1981

[54] SILICATE ACTIVATED LIGNOSULFONATE GEL TREATMENTS OF CONDUCTIVE ZONES

[75] Inventors: Dan D. Lawrence; Betty J. Felber, both of Tulsa, Okla.

[73] Assignee: Standard Oil Company (Indiana), Chicago, Ill.

[21] Appl. No.: 70,285

[22] Filed: Aug. 27, 1979

Related U.S. Application Data

[63] Continuation-in-part of Ser. No. 939,579, Sep. 5, 1978, abandoned.

[51] Int. Cl.³ .......................................... E21B 33/138
[52] U.S. Cl. .................................. 166/294; 166/270; 166/300; 405/264
[58] Field of Search ............... 166/270, 281, 282, 283, 166/294, 295, 300; 175/72; 252/8.5 A; 405/263, 264, 267

[56] References Cited

U.S. PATENT DOCUMENTS

| | | | |
|---|---|---|---|
| 3,168,511 | 2/1965 | King et al. | 252/8.5 C |
| 3,180,748 | 4/1965 | Holmgren et al. | 166/292 X |
| 3,437,625 | 4/1969 | Bonnel et al. | 166/295 X |
| 3,638,729 | 2/1972 | Parker | 166/273 |
| 3,785,438 | 1/1974 | Jackson et al. | 166/295 |
| 4,074,757 | 2/1978 | Felber et al. | 166/294 X |

Primary Examiner—James A. Leppink
Assistant Examiner—George A. Suchfield
Attorney, Agent, or Firm—Donald L. Traut; Fred E. Hook

[57] ABSTRACT

Highly conductive subterranean zones are treated with aqueous fluids containing gel-forming amounts of water-soluble lignosulfonate and silicate. Suitable treating fluids contain about 2 to about 5 weight percent sodium or ammonium lignosulfonate and sodium silicate at a weight ratio of $SiO_2$ to lignosulfonate of about 0.2 to about 1.

16 Claims, 8 Drawing Figures

SILICATE ACTIVATED LIGNOSULFONATE GEL TREATMENTS OF CONDUCTIVE ZONES

BACKGROUND OF THE INVENTION

This application is a continuation-in-part of application Ser. No. 939,579, filed Sept. 5, 1978, now abandoned, and all of application Ser. No. 939,579 is incorporated herein by this reference.

Enhanced oil recovery and waterflooding refer to the displacement of fluids from an injection well penetrating a crude-oil containing subterranean reservoir toward a production well penetrating the reservoir for producing crude oil. Many processes and compositions have been developed for improving the percentage of crude oil that can be produced in enhanced oil recovery and waterflood projects.

One problem encountered in waterflooding and enhanced oil recovery projects is that some reservoirs have highly conductive zones which accept disproportionate percentages of the crude oil displacing fluids. These conductive zones can be referred to as "thief zones". In some reservoirs, the fluid conductivities of various permeable strata of the reservoir are so different that a high percentage of the injected fluid will be conducted through only a small percentage of the volume of the reservoir. In other reservoirs, a high percentage of the injected fluid will be conducted through natural or man-made fractures or other voids defined by the formulation in which the reservoir is located. This problem can significantly increase the quantity of treating fluid required to displace a high percentage of crude oil from a reservoir.

Various treating fluids have been injected into subterranean reservoirs surrounding both injection and producing wells to reduce the rate with which fluid can be displaced through highly conductive zones. These treating fluids are characterized in that they have low viscosities when injected into the reservoir and have constituents that react within the reservoir to increase the viscosity of the treating fluids. The conductivity of permeable strata can be decreased by introducing a fluid that will attain a viscosity of about 5,000 to about 10,000 centipoise (cp) and can be significantly decreased by introducing a fluid that will develop a viscosity of about 1,000,000 cp. The conductivity of fractures or voids can be decreased by introducing a fluid that will develop a minimum viscosity of about 1,000,000 cp and can be significantly decreased by introducing a fluid that will develop a minimum viscosity of about 10,000,000 cp.

Examples of treating fluids which have been disclosed for reducing the conductivity of subterranean reservoirs are aqueous solutions of either water-soluble silicates with acidic activators or water-soluble polymers such as lignosulfonates, polyacrylamides, polysaccharides and carboxymethylcellulose with water-soluble dichromate activators. Aqueous solutions of water-soluble lignosulfonates with activating mixtures of water-soluble dichromate and alkaline earth metal halides, nitrates and carbonates have also been disclosed.

SUMMARY OF THE INVENTION

Conductive subterranean zones are treated to reduce their conductivity. Examples of troublesome highly conductive zones are permeable strata or fractures extending through subterranean formations. These formations are treated by injecting an aqueous fluid containing gel-forming amounts of a water-soluble lignosulfonate and a water-soluble silicate into the highly conductive zones. Suitable treating fluids contain about 2 to about 10 weight percent ammonium or sodium lignosulfonate and sodium silicate. The sodium silicate is included in the treating fluid at weight ratios of $SiO_2$ to lignosulfonate of about 0.2 to about 1. A satisfactory sodium silicate has a mole ratio of about 3.33 $SiO_2$ to $Na_2O$.

DETAILED DESCRIPTION

Figure 1:
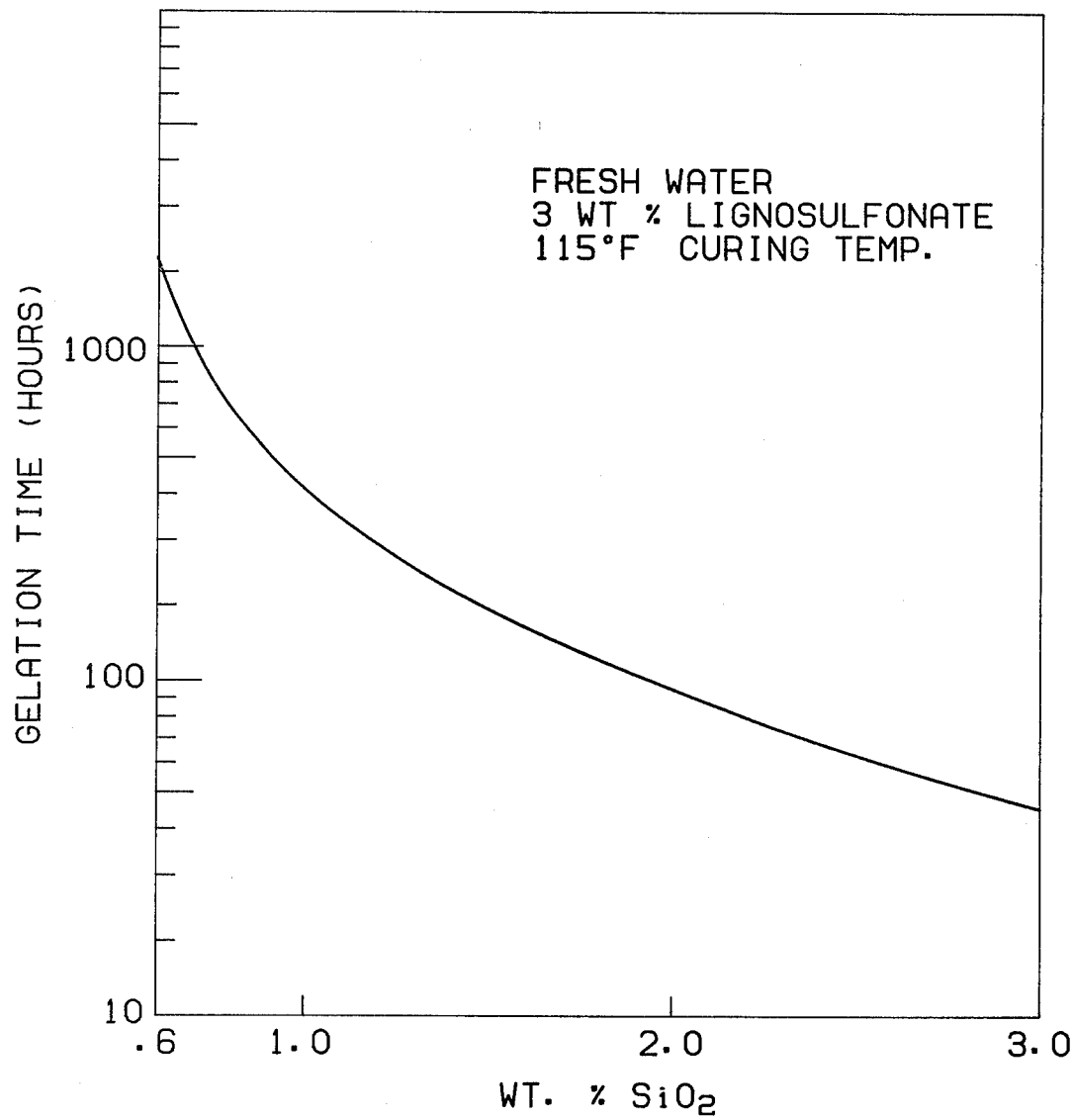
FIG. 1 shows the gelation time of $SiO_2$/lignosulfonate treating fluids containing 3 wt % lignosulfonate.

It has been discovered that an aqueous fluid containing gel-forming amounts of water-soluble lignosulfonate and water-soluble silicate is satisfactory for reducing the fluid conductivity of subterranean zones. The fluid of this invention is satisfactory for reducing the fluid conductivity of any subterranean zone such as a subterranean reservoir from which petroleum is being produced. This fluid can also be used to reduce fluid conductivity through the earth surrounding subterranean structures and through the fragmented rock in such subterranean processing zones as those used in oil shale retorting.

Suitable water-soluble lignosulfonates and silicates are commercially available as aqueous solutions or as powders. Suitable lignosulfonates are by-products of the sulfite process of pulp making, where the mixtures of coniferous and deciduous woods used in the process cause variations in the lignosulfonates produced. These lignosulfonates are generally available as the ammonium or sodium lignosulfonate. An aqueous treating fluid formulated with powdered lignosulfonate may contain insoluble salts that will need to be removed to prevent plugging the face of formations into which the fluid is to be injected. The silicates are generally aqueous alkaline solutions with a high proportion of silica which is largely in an ionized form. Useful water-soluble silicates having mole ratios of 2.06 and 3.33 $SiO_2$/$Na_2O$ are commercially available. Examples of other useful water-soluble alkali silicates are the potassium, lithium and quaternary ammonium silicates.

In the formulation of these treating fluids, the concentration of lignosulfonate, the weight ratio of silicate to lignosulfonate, the curing temperature, and the concentration of inorganic salt have all been found to be important factors in the gelation, gel, or set time of these treating fluids and in the strength of the resulting gels. As will be further illustrated with respect to the figures, the concentration of lignosulfonate, silicate and inorganic salt in the treatment fluid can be adjusted to obtain an appropriate gel viscosity and gelation time.

The treating fluid should be formulated with sufficient lignosulfonate for gelation with the water soluble silicate. This generally requires that the treating fluid contain a minimum of about 2 weight percent lignosulfonate. The upper limit on the concentration of lignosulfonate in the treating fluid is determined by the desired viscosity of the resulting gel. Suitable treating fluids can be formulated with 10 weight percent or more lignosulfonate; however, in the majority of instances fluids containing about 2 to about 5 weight percent lignosulfonate should provide sufficient gel viscosity for reducing the conductivity of zones in subterranean formations.

The treating fluid should be formulated with sufficient silicate for gelation with the lignosulfonate. This generally requires that the formulation contain a minimum of about 0.4 weight percent silicate. As in the case of the lignosulfonate, the upper limit on the concentration of silicate is determined by the desired gelation time. Additionally, gelation time is a function of the ratio of silicate to lignosulfonate. At low concentrations of lignosulfonate, the gelation time decreases with increasing concentration of silicate, whereas at higher concentrations of lignosulfonate, the gelation time increases with increasing concentration of silicate.

In order to predict the general trend of the gelation times of these treating fluids, it has been found to be helpful to maintain a constant weight ratio of silicate to lignosulfonate while changing the concentration of lignosulfonate. By conducting tests in this manner, the gelation times generally decrease and the gel viscosities generally increase as the treating fluids are formulated with increasing concentrations of lignosulfonate. It has also been found that gelation times generally increase with increasing ratios of silicate to lignosulfonate.

Figure 2:
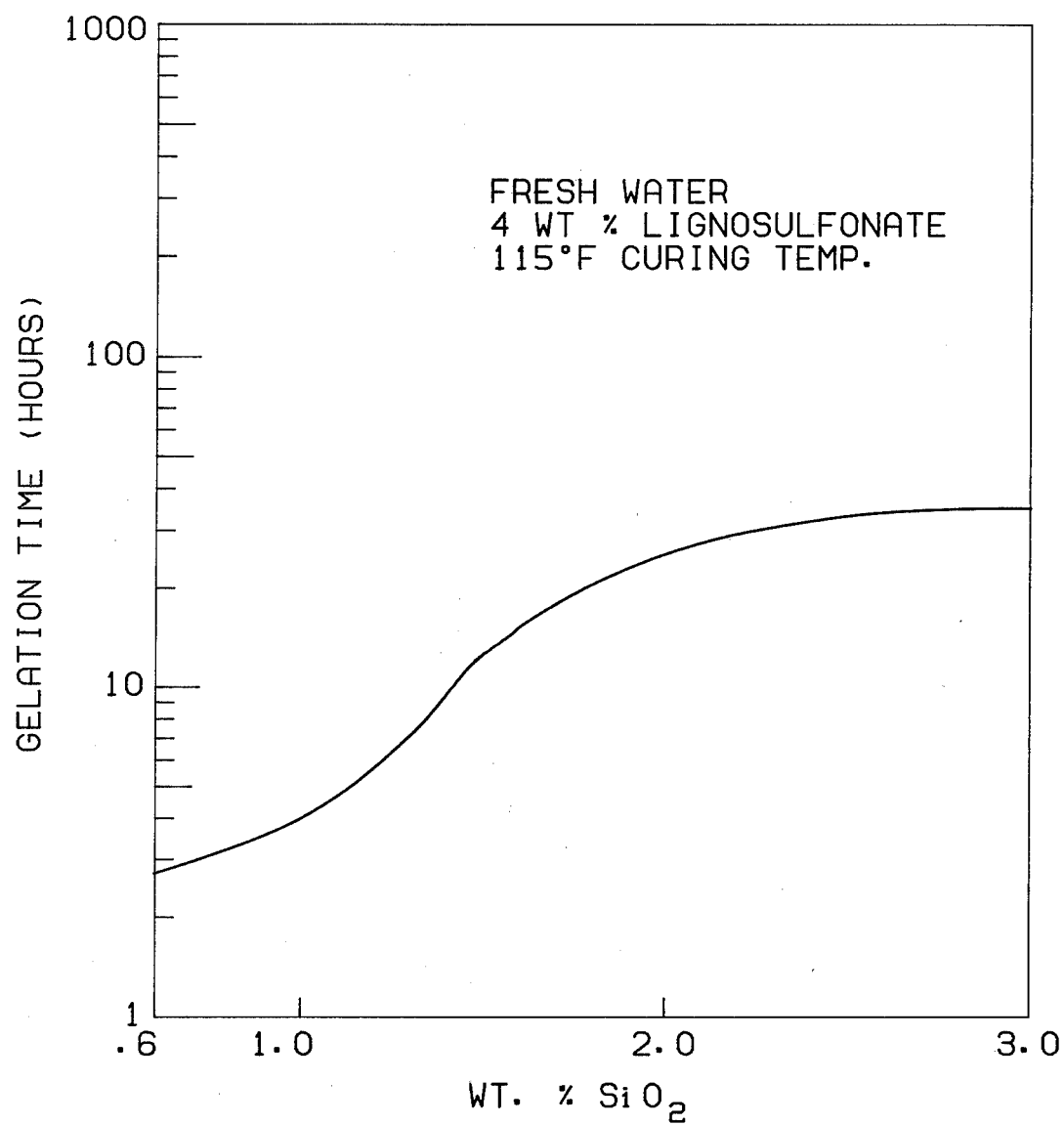
FIG. 2 shows the gelation time of $SiO_2$/lignosulfonate treating fluids containing 4 wt % lignosulfonate.

FIGS. 1 and 2 are included to illustrate the gelation times of these treating fluids formulated at two concentrations of lignosulfonate. The gel time at 115° F. of fresh water having dissolved therein 3 and 4 wt % of ammonium lignosulfonate and about 0.6 to about 3 wt % $SiO_2$ are illustrated, respectively, in FIGS. 1 and 2. At 3 wt % lignosulfonate, gelation times are shown to decrease at higher $SiO_2$ concentrations, whereas at 4 wt % lignosulfonate, gelation times are shown to increase at higher $SiO_2$ concentrations.

Figure 3:
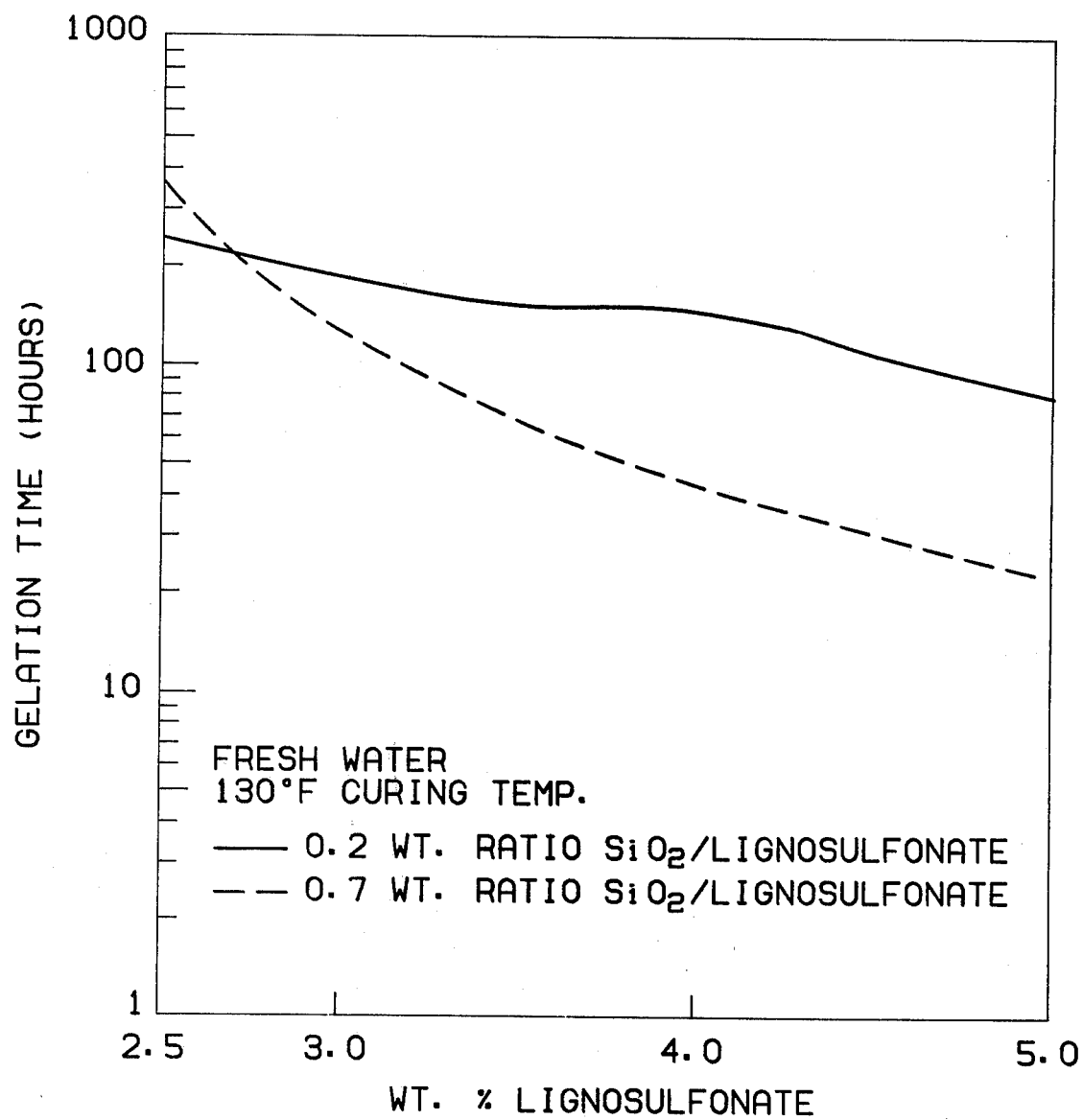
FIG. 3 shows the gelation time of $SiO_2$/lignosulfonate treating fluids formulated at $SiO_2$ to lignosulfonate weight ratios of 0.2 and 0.7.
Figure 4:
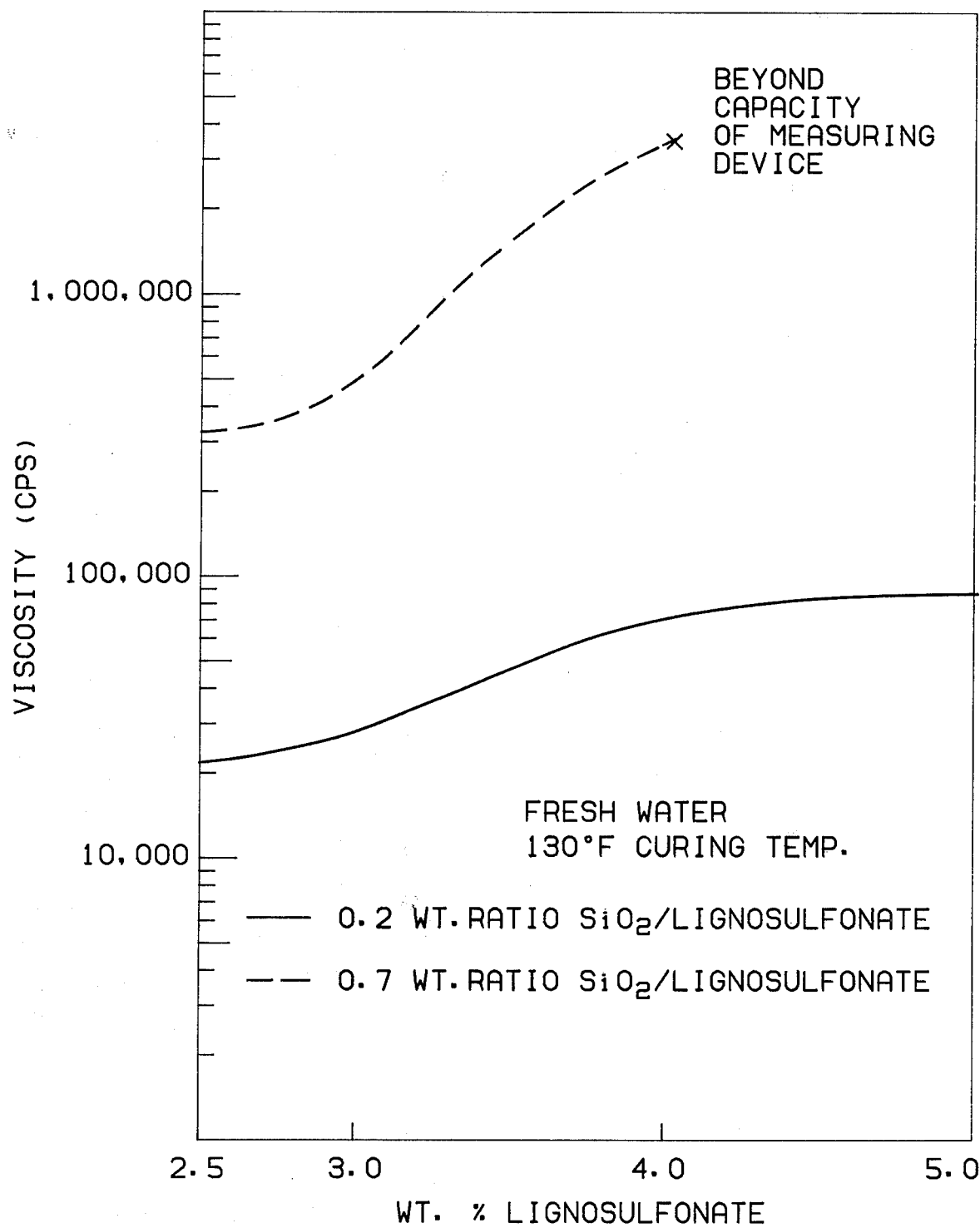
FIG. 4 shows the resulting gel viscosities of $SiO_2$/lignosulfonate treating fluids formulated at $SiO_2$ to lignosulfonate weight ratios of 0.2 and 0.7.

FIGS. 3 and 4 are included to illustrate the general trends of the gelation time and gel viscosity of these treating fluids formulated at constant weight ratios of silicate to lignosulfonate. The gelation times and gel strengths at 130° of potable water having dissolved therein about 2.5 to about 5 weight percent commercially available sodium lignosulfonate and water soluble sodium silicate at weight ratios of silicate to lignosulfonate of 0.2 and 0.7 are shown, respectively, in FIGS. 3 and 4. It is shown on these figures that at constant weight ratios of silicate to lignosulfonate, gelation time generally decreases and the viscosity of the resulting gel generally increases when the treating fluid is formulated at increasing concentrations of lignosulfonate.

Figure 5:
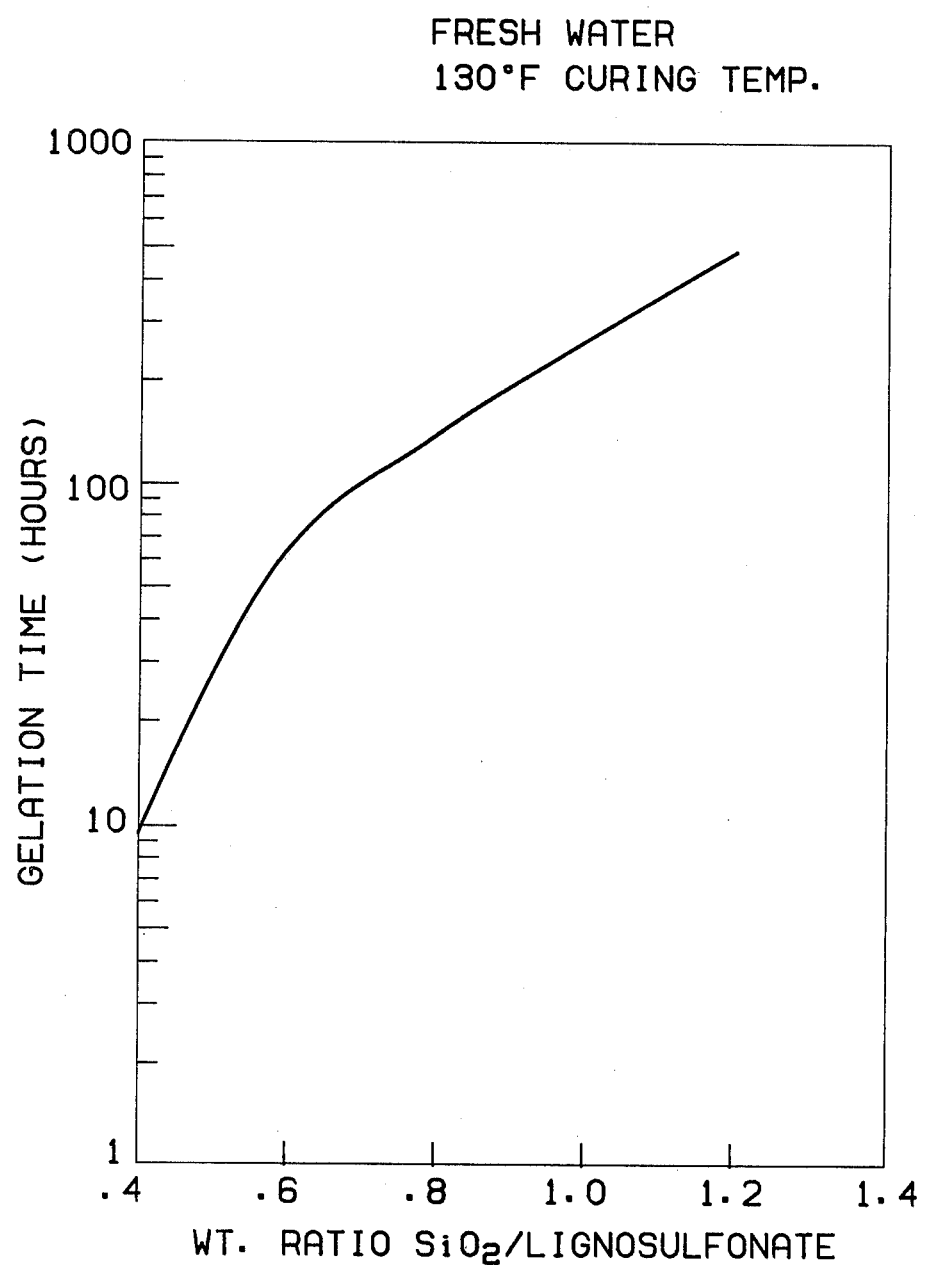
FIG. 5 shows the selection of the $SiO_2$ to lignosulfonate weight ratios based on gelation time.

FIG. 5 is included to illustrate the general trend of gelation times exhibited by these treating fluids when formulated at constant percentages of silicate and with increasing weight ratios of silicate to lignosulfonate. It is illustrated that gelation time generally increases with increases in the ratio of silicate to lignosulfonate.

Gelation time required for injecting these treating fluids, as is well known to those skilled in the art, depends largely upon the type of treatment to be performed. If the problem zone is at or near the wellbore, a treating fluid having a short gelation or set time, such as 10 hours or less, may be used. On the other hand, if it is intended to treat a large volume of the formation extending from the wellbore, a treating fluid having a longer gelation time, such as 100 or possibly 1000 hours, may be used.

It has been found that treating fluids having weight ratios of silicate to lignosulfonate of about 0.2 to about 1 are characterized in that the gelation time of these fluids generally decreases and gel strength generally increases with increasing lignosulfonate concentrations. Within these weight ratios, it has been found that a range of gelation times and gel viscosities required for treating subterranean formations can be obtained. It is illustrated in FIGS. 3 and 4 that the slopes of the gelation time and viscosity curves at a weight ratio of 0.2 are less than the slopes of the curves at a weight ratio of 0.7. At the weight ratio of 0.2 there are only small changes in the gelation time and gel viscosity with increases in lignosulfonate concentrations from 2.5 to 5 weight percent. At the weight ratio of 0.7 there are significant changes in gelation time and gel viscosity with increases in lignosulfonate concentration from 2.5 to 5 weight percent.

For many formation treating uses of this fluid, the ranges of gelation times and gel viscosities can be obtained by formulating the treating fluid at weight ratios of silicate to lignosulfonate of about 0.6 to about 0.9. Within these weight ratios, gel viscosities of less than 1,000,000 cp can be obtained by formulating the treating fluid with low concentrations of lignosulfonate and significantly higher gel viscosities can be obtained by formulating the treating fluids with higher lignosulfonate concentrations.

It has been found that the formulation of this treating fluid with fresh or potable water provides maximum gelation times and that certain inorganic salts in the formulation tend to reduce gelation time. When this fluid is formulated with water containing less than about 10,000 ppm dissolved solids, the dissolved solids may not have a significant influence on the gelation time of the fluid. However, if this water contains greater than about 100 ppm divalent and/or trivalent cations, the dissolved solids tend to significantly reduce the gelation time of the fluid. Water containing less than about 100 ppm divalent and trivalent cations and less than about 10,000 ppm dissolved solids can generally be used in the formulation of these treating fluids without the dissolved solids having a significant influence on gelation time.

Figure 6:
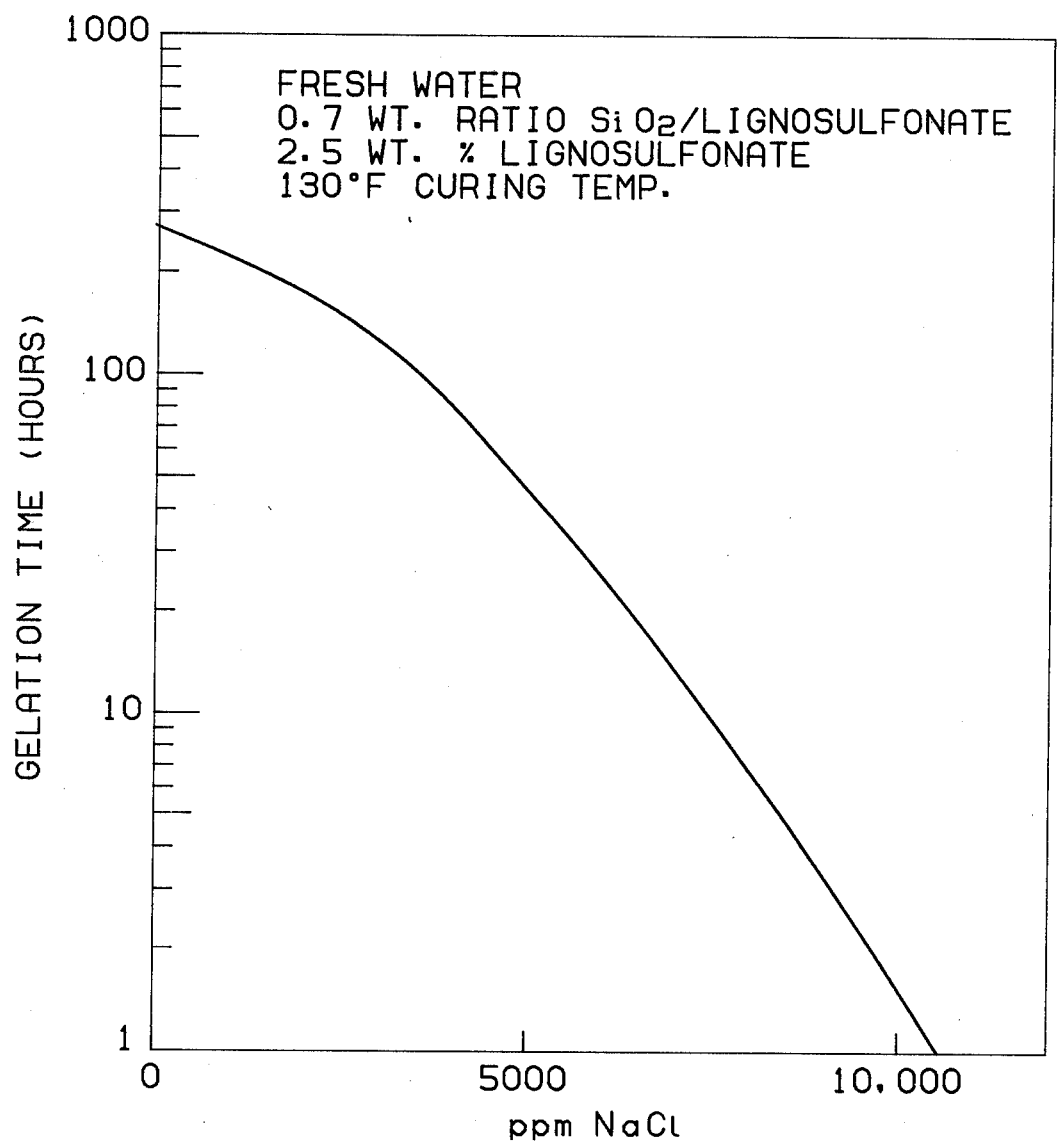
FIG. 6 shows the gelation time of $SiO_2$/lignosulfonate treating fluids formulated with sodium chloride.

FIG. 6 is included to illustrate the effect of inorganic salt on the gelation time of these treating fluids. Specifically, the gel times at 130° F. of potable water having dissolved therein about 2.5 weight percent ammonium lignosulfonate, water soluble sodium silicate at a weight ratio of silicate to lignosulfonate of about 0.7 and sodium chloride, are illustrated in FIG. 6.

Figure 7:
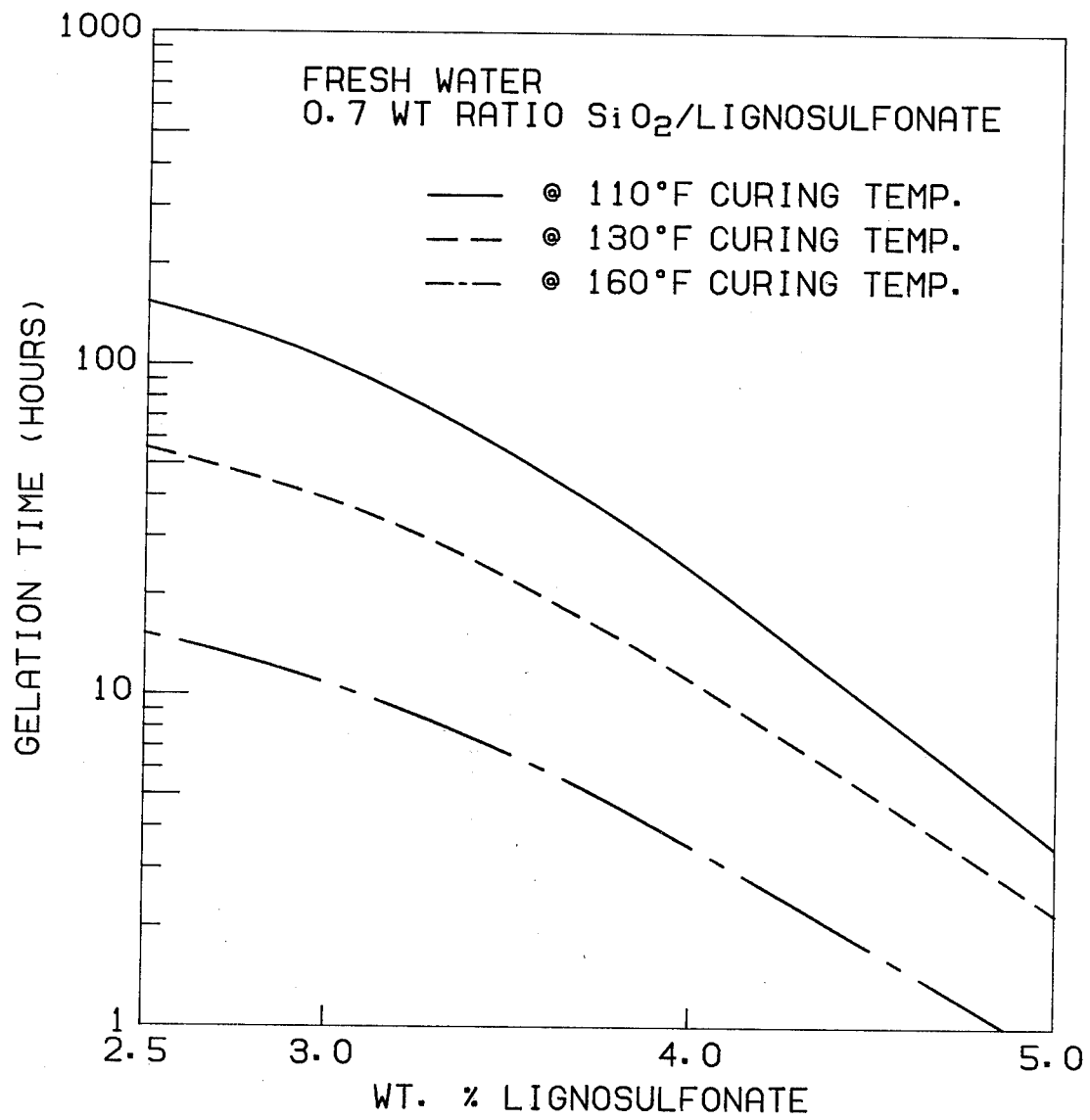
FIG. 7 shows the gelation time of $SiO_2$/lignosulfonate treating fluids cured at 110°, 130° and 160°.

It has been observed that the gelation time of these treating fluids generally decreases at higher curing temperatures. This is illustrated in FIG. 7 where the gelation times at 110° F., 130° F., and 160° F. of potable water having dissolved therein about 2.5 to about 5 weight percent ammonium lignosulfonate and water soluble silicate at a weight ratio of silicate to lignosulfonate of about 0.7 are shown.

The gelation times shown on FIGS. 1, 2, 4, 5, 6 and 7 and the gel viscosities shown in FIG. 3 were obtained by mixing commercially available lignosulfonate and sodium silicate. A sample of each mixture was prepared and placed in an oven at the designated curing temperature and was observed to determine the gelation time of the sample. The gel viscosities reported in FIG. 8 were measured with a commercially available Brookfield Model LVT viscometer with a commercially available Helipath attachment. In preparing the samples, the silicate and lignosulfonate were each separately diluted with an appropriate amount of fresh water to produce about half of the volume of the sample. The diluted silicate and lignosulfonate were then homogeneously mixed to produce the sample.

The ammonium lignosulfonate used in the tests illustrated in FIGS. 1, 2, 6 and 7 was produced as a by-product of the sulfite process of pulp making and contained about 55 wt % ammonium lignosulfonate, about 18 wt % sugars, and about 37 wt % of other constituents, all on a dry basis. The sodium lignosulfonate used in the tests illustrated in FIGS. 3, 4 and 5 was produced as a by-product of the sulfite process of pulp making and contained about 59 wt % sodium lignosulfonate, about 28 wt % sugars, and about 13 wt % of other constituents, all on a dry basis. The sodium silicate solution used in the tests illustrated in all of the Figures contained about 29 wt % $SiO_2$ and about 9 wt % $Na_2O$ to provide a solution having a mole ratio of about 3.33 $SiO_2$ to $Na_2O$, a density of about 11.7 lb/gal and a viscosity at 68° F. of about 200 cp.

Care should be exercised in the formulation of these treating fluids since they are activated on mixing of the silicate and lignosulfonate. As is illustrated in FIG. 5, shorter gelation times are expected at lower ratios of silicate to lignosulfonate; therefore, the ratio of silicate to lignosulfonate should be maintained at least at the design ratio or at a higher ratio during the formation of these fluids. The ratio of $SiO_2$ to lignosulfonate can be maintained at a ratio of $SiO_2$ to lignosulfonate that is higher than the design ratio during the formulation of these treating fluids by first mixing the water and silicate in a suitable circulating or mixing tank and thereafter circulating or agitating the treating fluid while slowly adding the lignosulfonate. This will prevent the formation of localized zones of low $SiO_2$ to lignosulfonate ratios.

Figure 8:
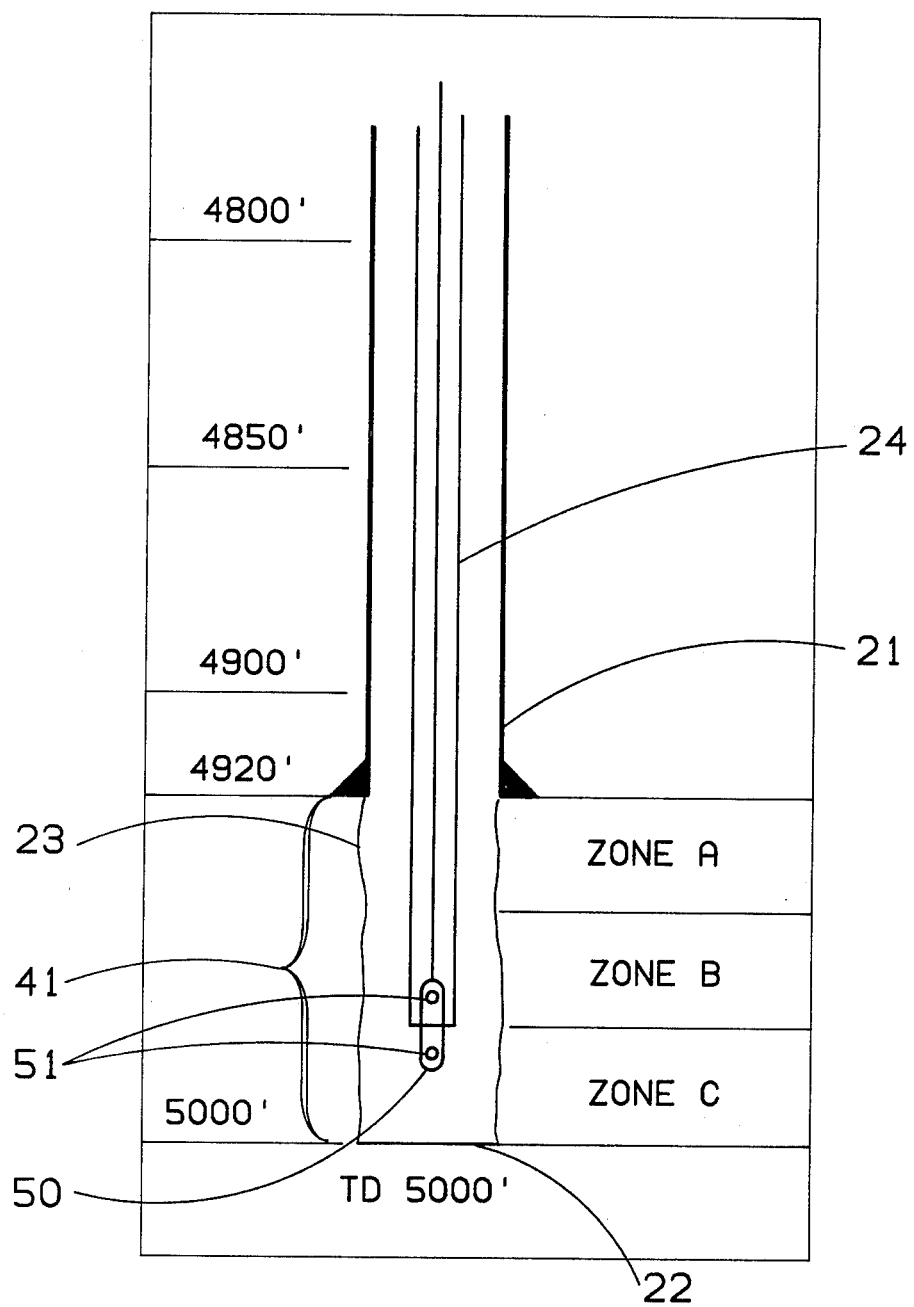
FIG. 8 illustrates the treatment of a subterranean formation with $SiO_2$/lignosulfonate treating fluids.

One waterflood oil recovery situation where a formation is amenable to treatment with these fluids is illustrated in FIG. 8. In this case, there is an early breakthrough of water at two different producing wells in fluid communication with the wellbore 23 followed by high water to oil ratio production through these producing wells. Flow tracer and temperature profiles indicate that about 70 vol % of the fluid injected into the injection interval 41 extending from the lower end of the casing 21 to the bottom 22 of the injection well is being injected into zone C. About 10 vol % of the injected fluid is being injected into zone A and about 20 vol % is being injected into zone B. Pressure transient data shows no evidence of fracturing and core analyses show zone C to be of large grain sandstone with an average porosity of about 20 vol % and a permeability of about 2 darcies. The bottomhole reservoir temperature is 130° F. and the temperature at the wellbore 23 throughout the injection interval 41 is about 97° F. The injectivity into the injection interval 41 is about 1000 bbl of water per day at 200 lb/sq in. gauge pressure at the surface. It is calculated that 2000 bbls of the gel-forming fluid of this invention could penetrate zone C to a radial distance of about 67 feet from the wellbore.

At an injection rate of 700 bbls/day, it would require approximately 67 hours to inject 2000 bbls of this treating fluid into zone C. The 2000 bbls of this treating fluid are designed to be formulated in four equal batches of 500 bbls/batch. The first batch is to be formulated to have a set time of 75 hours so that it will remain mobile until all of the treating fluid is injected. The second, third and fourth batches are to be formulated to, respectively, have set times of 57, 39 and 20 hours. Immediately prior to injecting the first batch of treating fluid into zone C, a preflush of 500 bbls of potable water is to be injected into zone C to reduce the possibility of contaminating the treating fluid with salt or other minerals which could be in zone C from natural sources or because of previous injections into zone C. The treating fluid can be injected into zone C by any suitable technique, such as by injecting the treating fluid through the tubing string 24 and by injecting water containing a radioactive tracer into zones A and B. The rate of injecting the radioactive water into zones A and B is to be balanced to the rate of injecting the treating fluid into zone C, such that the interface between the radioactive water and the treating fluid would be in the interval between the radioactive sensing elements 51 of the commercially available radioactive logging tool 50. When the injection of the treating fluid into zone C is completed, the treating fluid will be maintained in zone C for a sufficient time for the fluid to gel. The treating fluid can be maintained in place by any suitable means, such as by maintaining pressure on the wellbore 23. The pressure can be maintained on the wellbore 23 by filling the wellbore with fluid of sufficient density to maintain the treating fluid in place.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

What is claimed is:

1. A method of reducing the fluid conductivity of a conductive subterranean zone, which comprises:
   introducing an aqueous fluid containing gel-forming amounts of water-soluble lignosulfonate and water-soluble silicate into said conductive zone and maintaining said aqueous fluid in said zone until said aqueous fluid is converted to a gel.

2. The method of claim 1 wherein the weight ratio of $SiO_2$ to lignosulfonate is about 0.2 to about 1.

3. The method of claim 1 wherein the weight ratio of $SiO_2$ to lignosulfonate is about 0.6 to about 0.9.

4. The method of claim 1 wherein the aqueous fluid contains about 2 to about 10 wt % lignosulfonate.

5. The method of claim 1 wherein the aqueous fluid contains about 2 to about 5 wt % lignosulfonate.

6. A method of reducing the fluid conductivity of a conductive zone, which comprises:
   introducing a gel-forming fluid comprising an aqueous fluid containing about 2 to about 5 wt % water-soluble sodium or ammonium lignosulfonate and water-soluble sodium silicate at a weight ratio of $SiO_2$ to lignosulfonate of about 0.2 to about 1 into said conductive zone and maintaining said aqueous fluid in said zone until said aqueous fluid is converted to a gel.

7. The method of claim 6 wherein the sodium silicate has a mole ratio of about 3.33 $SiO_2/Na_2O$.

8. The method of claim 7 wherein the weight ratio of $SiO_2$ to lignosulfonate is about 0.6 to about 0.9.

9. In a method of treating a subterranean formation penetrated by at least one injection well and having at least one highly conductive zone therein, said zone having a higher fluid conductivity than another conductive zone in the formation, wherein aqueous gel-forming fluid is displaced at least a portion of the way through said highly conductive zone and forms a gel within the formation to reduce the conductivity of said highly conductive zone, the improvement comprising:
displacing at least a portion of the way through said highly conductive zone an aqueous fluid containing gel-forming amounts of water-soluble lignosulfonate and water-soluble silicate.

10. The method of claim 9 wherein the weight ratio of $SiO_2$ to lignosulfonate is about 0.2 to about 1.

11. The method of claim 9 wherein the weight ratio of $SiO_2$ to lignosulfonate is about 0.6 to about 0.9.

12. The method of claim 9 wherein the aqueous fluid contains about 2 to about 10 wt % lignosulfonate.

13. The method of claim 9 wherein the aqueous fluid contains about 2 to about 5 wt % lignosulfonate.

14. In a method of treating a subterranean formation penetrated by at least one injection well and having at least one highly conductive zone therein, said zone having a higher fluid conductivity than another conductive zone in the formation, wherein an aqueous gel-forming fluid is displaced at least a portion of the way through said highly conductive zone and forms a gel within the formation to reduce the conductivity of said highly conductive zone, the improvement comprising:
employing as the gel-forming fluid an aqueous fluid containing about 2 to about 5 wt % water-soluble sodium or ammonium lignosulfonate and water-soluble sodium silicate at a weight ratio of $SiO_2$ to lignosulfonate of about 0.2 to about 1.

15. The method of claim 14 wherein the sodium silicate has a mole ratio of about 3.33 $SiO_2/Na_2O$.

16. The method of claim 14 wherein the weight ratio of $SiO_2$ to lignosulfonate is about 0.6 to about 0.9.

* * * * *